United States Patent [19]
Cunningham-Reid et al.

[11] Patent Number: 5,164,894
[45] Date of Patent: Nov. 17, 1992

[54] METHOD OF DATA ENTRY INTO A PLANT LOOP

[75] Inventors: John Cunningham-Reid, Chardon; James S. Westrum, Willoughby Hills; Edward D. Janecek, Cleveland Heights, all of Ohio

[73] Assignee: Elsag International B.V.

[21] Appl. No.: 517,971

[22] Filed: Apr. 26, 1990

[51] Int. Cl.⁵ .............................. G06F 15/46
[52] U.S. Cl. ......................... 364/131; 340/825.06; 364/138; 364/DIG. 1; 364/DIG. 2; 395/200; 395/250
[58] Field of Search ............... 364/131–133, 364/138, 139, 188, 189, 200 MS File, 900 MS File; 340/825.05, 826.06; 370/85.5, 85.12, 85.15; 395/200, 250

[56] References Cited
U.S. PATENT DOCUMENTS

| | | | |
|---|---|---|---|
| 3,597,549 | 7/1969 | Farmer | 364/200 |
| 4,007,441 | 2/1977 | Faber | 364/200 |
| 4,304,001 | 12/1981 | Cope | 364/132 |
| 4,517,637 | 5/1985 | Cassell | 364/138 |
| 4,554,659 | 11/1985 | Blood et al. | 370/85.12 |
| 4,628,437 | 12/1986 | Poschmann et al. | 364/138 |
| 4,663,704 | 5/1987 | Jones et al. | 364/138 |
| 4,689,736 | 8/1987 | Glaudel et al. | 364/132 X |
| 4,791,547 | 12/1988 | Petroff | 364/132 |
| 4,803,634 | 2/1989 | Ohno et al. | 364/138 |

*Primary Examiner*—Joseph Ruggiero
*Attorney, Agent, or Firm*—Vytas R. Matas; Robert J. Edwards

[57] ABSTRACT

A plant loop communication system utilizing a plurality of Loop Interface Slave (LIS) modules, each of which being an intelligent slave module incorporating its own microprocessor, is described. The use of such a module permits off-load processing so that receiving, transmitting and message processing cam occur simultaneously. A Superloop Bus Module (SBM) contains a data base which allows the asynchronous operation of the system. A Superloop Storage Module (SSM) stores data for transmission onto the loop and/or incoming data for transmission to an operator console.

3 Claims, 7 Drawing Sheets

| | | | |
|---|---|---|---|
| (6) Rx-int | -handle receivers<br>-chk for errors<br>-pick channel<br>-add msgs to CH-queue<br>-set RX-DMA pointers<br>-re-enable RX | -fire Tx proc<br>-chk for time-sync | |
| (5) Tx-int | -handle transmitter interrupt @ end of msg<br>-chk for errors<br>-set Tx-complete status<br>-manage Rx-buf "new" & "end_msg" ptrs<br>-set msg-Rx'd status for Xbus, cause int<br>-fire Tx_proc | | |
| (4) Tx_proc | -start all msg Tx<br>-forward/receive or originate<br>-remove msgs from CH-queue<br>-set Tx-DMA pointer & count<br>-process destination lists<br>-start copy to receive-buf if req | -handle time-sync/LIS-poll/<br>broadcast | |
| (3) Timer-int | -maintain local millisecond time<br>-manage timers<br>-set flags, fire ints on expirations | | |
| (2) XBUS-int | -service int-status, clear int<br>-set flags, fire ints per status | | |
| (1) src_proc | -prep msgs for origination<br>-manage Tx-buf pointers<br>-process 'dest' field after Tx<br>-handle retries/watchdog<br>-build replies/to Tx-reqs | | |
| (0) misc_proc | -handle non-critical tasks<br>-service outbound FIFO<br>-scan PCU status table<br>-build LIS-poll msgs for Tx<br>-generate status-change rpts | -send replies to Tx-reqs<br>-reply to status-reqs incl handshake<br>-sample power-system status<br>-run self-diagnostics | |

METHOD OF DATA ENTRY INTO A PLANT LOOP

This is a division of application Ser. No. 07/162,762, filed Mar. 1, 1988, now abandoned.

TECHNICAL FIELD

The present invention relates to a process control communication system and more particularly to a communication system which utilizes the plant loop concept and optimizes communication between control modules within the system and between control modules and various other system devices.

BACKGROUND ART

Communication within a large process control system typically utilizes a plant loop consisting of a cable and a series of nodes or drops off of the cable permitting transmission of data between control modules and other modules within the system or between control modules and various data acquisition devices.

In prior art plant loop communication systems, a typical form of communication involves sending field I/O points to a data acquisition device for display and archiving purposes. The technique that is used for the foregoing is to input the data from a field I/O point into a control module. That data is then passed across the module bus to a bus interface module which transforms the data into a message which is passed out onto the plant loop. The messaging capability on the plant loop is such that initially each I/O point requires a separate message on the plant loop. This situation has been improved to where several pieces of data can be sent within the same message but each message is still transmitted to only one destination.

The data is typically transmitted as exception reports, i.e., a piece of data is transmitted across the loop only when it has changed significantly or has not been reported for some pre-determined time period. In larger process control systems, the same piece of data must be sent to many different devices each requiring a separate message, thus potentially overloading the loop. Other inherent problems with the prior art plant loop communication system include node recognition, i.e., a node not recognizing when another node is busy. This, in combination with the large number of exception reports that are sent when a node is restarted, causes the destination node to become busy again. The foregoing results in a thrashing condition where a node is seen to be toggling on-line and off-line, depending upon whether it is busy or not. With larger systems having many operator consoles and many I/O points within a single process control unit, this becomes a very serious problem.

A third problem which is significant is the size of the message that can be transmitted on a loop. The maximum size message is 127 bytes and the way that the message is packed, or how much data is packed into the message, is completely determined by the source of the data with no consideration for the impact the message has on the loop. If the loop is particularly busy, a process control unit that has a large amount of data to send still attempts to force the data out onto the loop which aggravates the situation. If the loop is lightly loaded, i.e., there is additional room for messages to be transmitted on the loop, the bus interface module still packs large messages if data is available. This results in an inefficient use of the available bandwidth, or message capability, on the plant loop communication system.

One additional problem that is experienced with the foregoing plant loop communication system is the method by which the various drops on the system receive time information. It is necessary for all drops on the loop to be time synchronized. The method used to achieve time synchronization is to have one node act as a master. Through a series of two messages, an attempt is made to synchronize each node to the node acting as the master. This approach typically results in a time shift of two to three seconds between nodes on a single plant loop. The entire method can take approximately three seconds per drop on the system which results in heavily loaded systems waiting several minutes before all the nodes are synchronized to the same time.

SUMMARY OF THE INVENTION

The present invention solves the problems associated with the prior art and other problems by utilizing a Loop Interface Slave (LIS) which is an intelligent slave module incorporating its own microprocessor. As such, this module also includes several integrated circuits for receiving and transmitting messages. The purpose of the circuits is to permit off-load processing from the microprocessor so that receiving, transmitting and message processing can occur simultaneously, thus, eliminating serial operation of the system. The Loop Interface Slave (LIS) module replaces the module utilized for interfacing with the communication loop in prior art plant loop communication systems. A Superloop Bus Module (SBM) acts as the replacement for the module utilized for interfacing with the communication bus in the prior art system. The SBM contains a data base which allows the asynchronous operation of the loop and the module bus. A Superloop Storage Module (SSM) acts as the interface between the operator console and the LIS. The SSM stores data for transmission onto the loop and/or incoming data for transmission to the operator console.

DESCRIPTION OF THE PREFERRED EMBODIMENT

Figure 1:
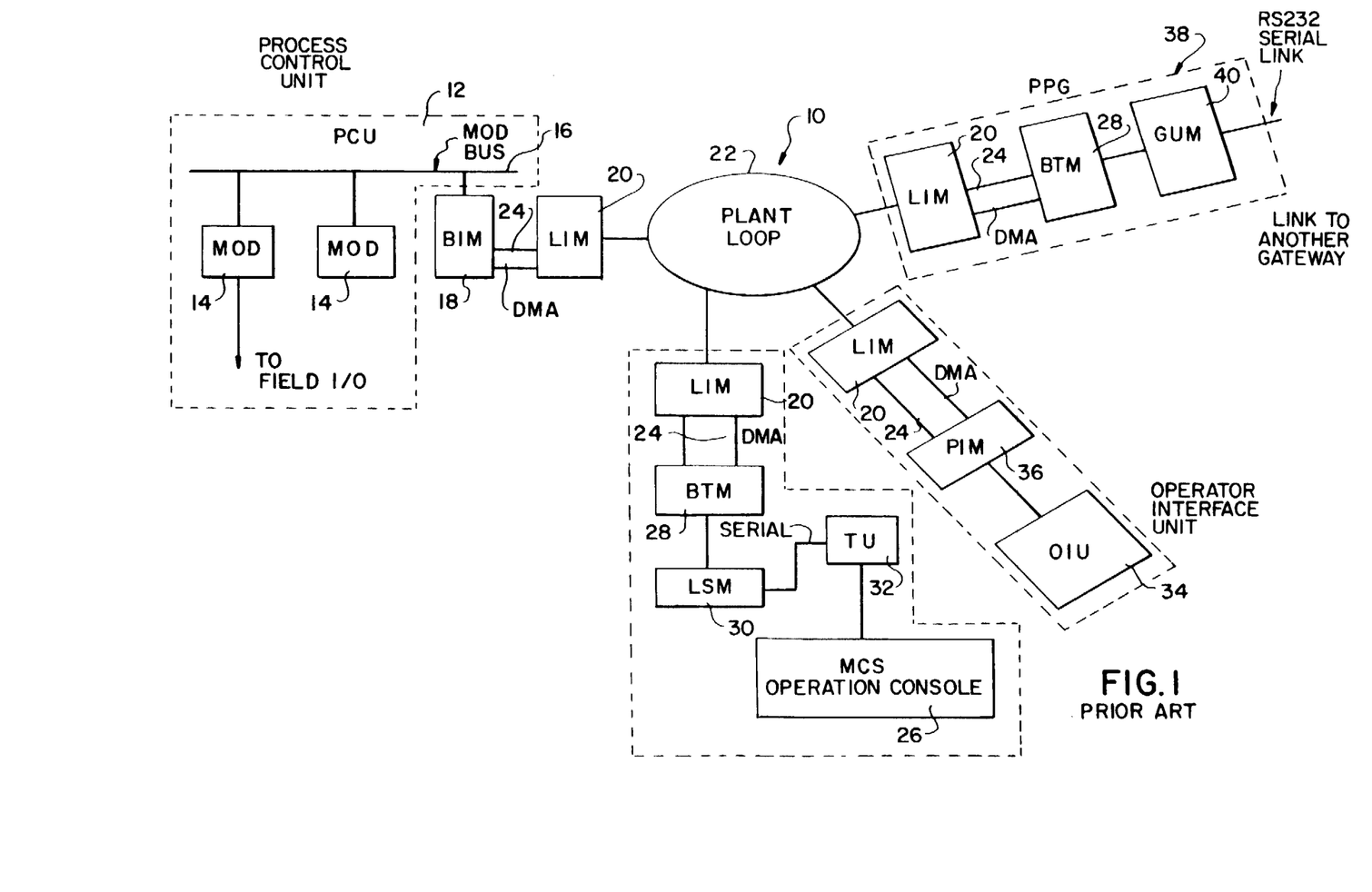
FIG. 1 is a schematic drawing of a prior art plant loop communication system.

Referring now to the drawings where the illustrations are for the purpose of describing the preferred embodiment of the present invention and are not intended to limit the invention hereto, FIG. 1 is a schematic drawing of a prior art plant loop communication system 10. As such, the process control unit 12 within the system 10 typically consists of one or more control modules 14. The function of the control modules 14 is to receive data from field input and output points, to perform any calculations which may be necessary, and to implement the control strategy by providing output signals to control the process. The process control unit 12 is self contained and no other part of the system 10 is typically needed to implement the control strategy of the process. The modules 14 are connected to a Module Bus (MOD BUS) 16 which acts as the communication channel between the modules in the process control unit 12 permitting the modules to communicate with a Bus Interface Module (BIM) 18. The Bus Interface Module 18, in turn, is connected to the Loop Interface Module (LIM) 20 which acts as an interface between the process control unit 12 and the plant loop 22 which is, in essence, the cable that connects all of the LIM's, BIM's and various other interfaces together. The Loop Interface Module (LIM) 20 forwards messages on the plant loop 22, sources messages for the process control unit in which it is contained and transmits incoming messages to the local process control unit. The LIM 20 contains a Direct Memory Access (DMA) channel 24 which allows data to be transmitted to the BIM 18. The BIM 18 has a data base which holds incoming data for reporting to the local modules and also receives data from the modules by polling for data that has changed.

Another type of drop in the plant loop communication system 10 provides for data acquisition. This function is performed by a Management Command System 26 which is a standard operator console having the capability to do archiving and trending of data. The interface between the Management Command System 26 and the plant loop 22 is provided by a Loop Interface Module (LIM) 20, a Bus Transfer Module (BTM) 28, and a Loop Storage Module (LSM) 30. The Direct Memory Access channel (DMA) 24 interconnects the LIM 20 and the BTM 28. The BTM 28 transfers loop data from the LIM 20 to the LSM 30 which acts as a data base for incoming and outgoing data. The LSM 30, in turn, is connected by a serial link to a Termination Unit (TU) 32 which permits connection of the operator console comprising the Management Command System 26 to the plant loop 22.

An Operator Interface Unit (OIU) 34 is also provided for interfacing with the system. In this case, access to the system is provided by a LIM 20, a DMA channel 24 and a Process Interface Module (PIM) 36 which, in turn, is connected to the OIU 34. Typically, the OIU 34 is another operator station that has a graphic screen and some storage and trending capability.

In the remaining drop shown on FIG. 1, there is illustrated a Plant Loop to Plant Loop Gateway (PPG), designated generally by the numeral 38. The PPG 38 is a device which permits communication between plant loops which are located remotely or in close proximity to one another. This interface consists of a LIM 20 with a DMA channel 24 and a BTM 28. The BTM 28 communicates through the module bus to a Gateway Communication Module (GCM) 40 which is utilized to store data permitting asynchronous operation of the plant loop and the slower link associated with another gateway. This link to another gateway can be either a direct cable or can be a microwave and modem arrangement for remote applications.

As previously stated, the foregoing prior art plant loop communication system 10 has a number of inherent problems. For example, each message on the plant loop can go to only one destination. Thus, if a single message is to be transmitted to multiple destinations, a separate message must be transmitted to each destination. The foregoing results in unnecessary system loading. Another problem with this prior art plant loop communication system is that a node cannot recognize when another node is busy. For example, if a piece of data is being sent to a Management Command System, and the interface for the Management Command System is too busy to handle the piece of data at that time (due to a full buffer in the LIM), the Management Command System is seen by the data source as having failed. Eventually, when the buffer clears, the Management Command System is perceived as being back in the system or on-line which causes all nodes to establish routes to this node. Routing messages take longer to process than most other messages. This condition, in combination with the large number of exception reports that are sent when a node is restarted, causes the destination node to become busy again resulting in a thrashing condition where a node is seen to be toggling on-line and off-line, depending upon whether it is busy or not. Another problem is the size of the message that can be transmitted on the loop. The maximum size message is 127 bytes and the manner in which the message is packed, or how much data is packed into the message, is completely determined by the source of the data with no consideration for the impact that the message has on the loop. For example, if a Management Command System is busy or if the loop is heavily loaded, a process control unit that had a large amount of data to transmit would still attempt to force the data out onto the loop aggravating the loading of same. If the loop is lightly loaded, the BIM still packs large messages if data is available. Another problem occurs when it is necessary for all the drops on the loop to be timed synchronized. The method of time-synchronizing requires one node to act as the master. The typical approach is to have a Management Command System or an Operator Interface Unit, where the operator would set the time, act as the master. The Management Command System or the Operator Interface Unit then tests each node individually and attempts to transmit a series of two messages to the node to synchronize the node to the same time as set on the Management Command System or the Operator Interface Unit. This approach typically results in a time shift of two to three seconds between nodes on a single plant loop. The entire method takes approximately 3 seconds per drop to time-synchronize, which results in a heavily loaded system waiting several minutes before all nodes are synchronized to the same time.

The present invention solves the problems associated with the foregoing prior art plant loop communication systems by the introduction of a new module called the Loop Interface Slave (LIS) which is an intelligent slave module incorporating its own microprocessor. As such, it also includes several integrated circuits for receiving and transmitting messages. The purpose of these circuits is to permit off-load processing from the microprocessor so that receiving, transmitting and message processing can occur simultaneously; thus eliminating serial operation of the system. In order to transmit the data from the plant loop to the communication module, i.e., the module responsible for storing the data, the data is transmitted across a parallel bus called the expander bus. The expander bus has been used in plant loop communication systems as a communication channel between a control module and its slaves, however, the use of the expander bus in the present invention is new. The Loop Interface Slave (LIS) module replaces the Loop Interface Module (LIM) of the prior art plant loop communication system. A new communication module, the Superloop Bus Module (SBM) serves as the functional replacement for the Bus Interface Module (BIM) of the prior art communication system. The SBM contains a data base which allows the asynchronous operation of the loop and the module bus. Inasmuch as there is a significant difference in the speed of operation of the loop and the module bus, it is necessary to store data in a data base in order to allow the slower module bus to process all of the data as quickly as possible without losing same. The SBM determines the packing algorithm and how messages are going to be sent on the loop.

The operator's console in the present invention communicates through the Loop Interface Slave (LIS), as does the Process Control Unit (PCU). The device which interfaces the operator console with the LIS is the Superloop Storage Module (SSM) which stores data for transmission onto the loop and/or incoming data for transmission to the operator console. The SSM is analogous to the Loop Storage Module (LSM) in the prior art plant communication system but the SSM is responsible for implementing the improvements which solve the problems associated with the prior art.

Firmware is a computer executable program which is stored in a read-only memory microchip that is plugged into a printed circuit board. The purpose of the firmware is to permit the hardware to perform the function for which it was designed. Firmware may be distinguished from software by the manner in which the program is stored. Hardware typically comprises devices that are actual physical components. Software is an intangible computer program including instructions that make the device operate. Firmware is a hybrid in that it is a computer program but it is stored in a piece of hardware that plugs into a printed circuit board.

Figure 2:
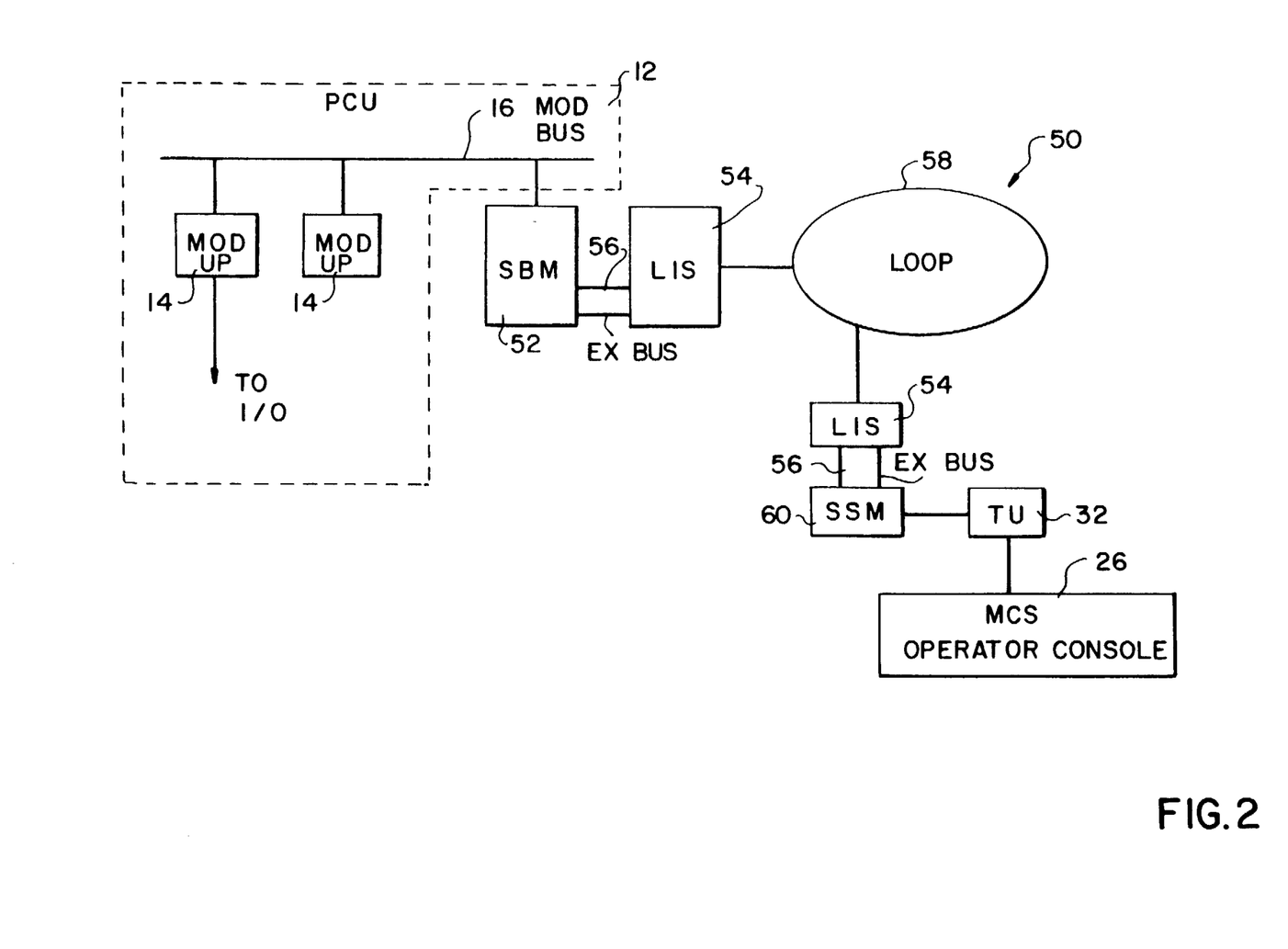
FIG. 2 is a schematic drawing of the present invention.

Referring now to FIG. 2 which is a schematic diagram of the present invention, there is illustrated a plant loop communication system 50 utilizing the Superloop Bus Module (SBM) 52. Those components which are similar to the components previously discussed with respect to the prior art plant communication system 10 will have like reference numerals and will not be discussed further. As previously stated, the Superloop Bus Module (SBM) 52 is the interface which connects the Loop Interface Slave (LIS) 54 to the Module Bus (MOD BUS) 16. The SBM 52 communicates to the LIS 54 across the Expander Bus (EX BUS) 56. The LIS 54 is connected onto the loop, shown generally by the numeral 58, that represents the cable that makes up the communication medium. The drop for the Management Command System 26 consists of a Loop Interface Slave (LIS) 54 which communicates over an Expander Bus (EX BUS) 56 to the Superloop Storage Module (SSM) 60 which contains the data base for incoming and outgoing data from this particular drop.

Figure 3:
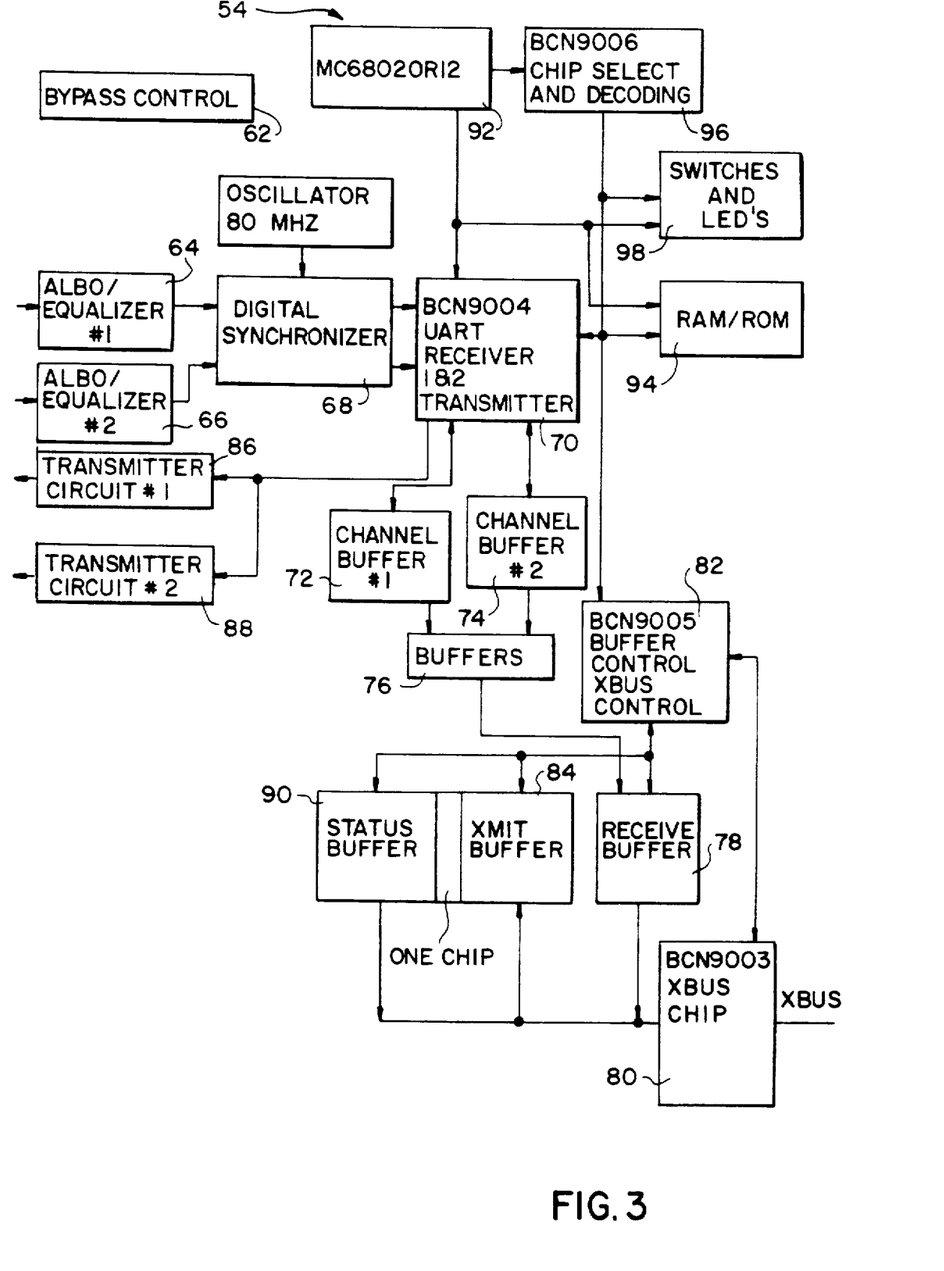
FIG. 3 is a schematic drawing of the Loop Interface Slave (LIS) module utilized in the present invention.

Referring now to FIG. 3 which is a schematic diagram of the hardware included in the Loop Interface Slave (LIS) 54, this module includes a bypass control 62 which determines whether or not the LIS 54 is connected to the loop 58. This bypass control 62 typically consists of Opto Isolators to isolate the loop electrically from the rest of the circuitry comprising the LIS 54. When the bypass control 62 is switched off, the LIS 54 is no longer connected to the loop 58; when it is switched on, the LIS is capable of transmitting messages into and out from the loop. The LIS also includes ALBO/equalizers 64 and 66 which are automatic line build-out circuits whose function is to take a signal regardless of its incoming strength and transform it into a signal having consistent strength in terms of both amplitude and frequency. The output of the equalizers 64 and 66 is transmitted to a digital synchronizer 68 whose function is to compare the incoming data to ensure that the same data is being transmitted on both channels. The output of the digital synchronizer 68 is connected to a Universal Asynchronous Receiver Transmitter (UART) 70 which includes a direct memory access controller. The UART 70 translates incoming protocol data into information that can be used by the LIS hardware. The output of the UART 70 is connected to channel buffers 72 and 74 which act as memory buffers where data is stored until it can be used by the remaining components within the LIS. The outputs of the channel buffers 72 and 74 are connected to buffers 76 which includes a set of temporary holding registers that hold the data as it is transmitted from the channel buffers. The output of the buffers 76 is connected to a receive buffer 78 which is the final location for the incoming data from the channel buffers 72 and 74. Once it is determined that the data in the receive buffer 78 is needed by a particular node associated with this Loop Interface Slave (LIS), the data is then transmitted to a X-BUS chip 80 via the X-BUS control block 82. The data within a X-BUS chip 80 is then transmitted into either the Superloop Bus Module (SBM) 52 or the Superloop Storage Module (SLM) 60, as shown in FIG. 2.

With respect to the manner in which data is sent out to the loop from the LIS, a X-MIT buffer 84 holds outbound messages until they are ready to be transmitted. At time of transmission, the data is transmitted from the X-MIT buffer 84 to the UART 70 which converts it to the proper format for the protocol. The message is then transmitted outwardly through transmitter circuits 86 and 88. Each of these transmitter circuits transmits data into one of the two redundant channels from which the messages are outputted from the LIS. A Status Buffer 90 contains messages that were produced by the LIS but have been returned. Incoming status type data would be stored in the Status Buffer 90 until it could be transmitted across the expander bus to the communication module.

A microprocessor 92 is provided and controls the operation of the circuitry. The microprocessor 92 is responsible for reading and writing to the random access memory (RAM) and for reading from the read-only memory (ROM), both memories being shown generally by the numeral 94. The ROM stores the firmware which makes the LIS operate. On start-up of the LIS, the program is loaded from the ROM into the RAM permitting the program to run more rapidly. A chip select and decoding microcircuit 96 is provided and is responsible for selecting which of the previously described circuits has access to a data line at any particular time. A plurality of switches and LED's, shown generally by the numeral 98, includes a set of 32 switches which define parameters that determine the manner in which the chip select and decoding microcircuit 96 is to operate. For example, one switch may select between the diagnostic mode and the normal operating mode, and there are switches to establish an address that makes the LIS unique from other LIS's in the system. The LED's are visible from the front panel of the LIS and are used to display either message counts or diagnostic codes.

The word "software" refers to the program that makes the LIS hardware operate in the manner in which it was designed to operate. To clarify the use of the software and the manner in which it operates, the ROM, shown on FIG. 3, has the ability to maintain the program without power. Thus, if power is removed from the ROM, the program will still reside therein, however, the program cannot be executed until power is restored. The RAM does not have the foregoing property inasmuch as once power is removed, the program contained therein is lost. The ROM is only to be read from, as the name implies, and cannot be written to in the normal course of program execution. Frequently in the execution of software, it is desirable to save some data in the RAM in order to free the microprocessor to do some other task. The RAM in the LIS serves two purposes, one of which is to store data temporarily during program execution and the other being to hold the program which is stored in the ROM and permit more rapid execution than if said program were executed directly from the ROM. It should be noted that the blocks which are labeled as buffers on FIG. 3 are, in fact, random access memories. They are a specialized form of RAM in that they cannot be accessed by a microprocessor to save any data. For example, the channel buffers 72 and 74, the buffers 76, and the receive buffer 78 are used specifically for incoming messages. The receive hardware, rather than the firmware or the microprocessor, controls the routing of the incoming messages. The X-MIT buffer 84 is also a specialized form of RAM for outgoing messages.

Figure 4:
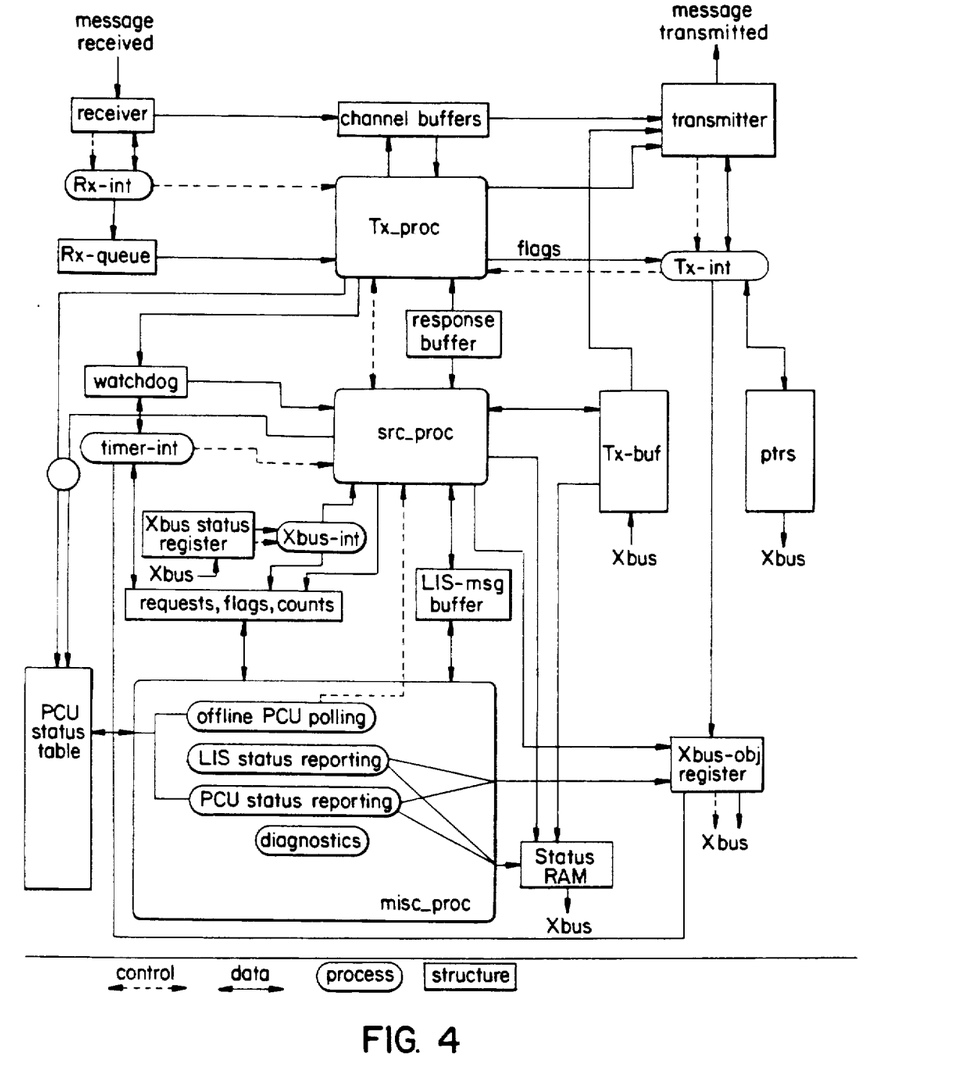
FIG. 4 is a schematic drawing of the software or firmware utilized by the Loop Interface Slave (LIS) module of the present invention.

Referring to FIG. 4, which is a block diagram of the LIS software or firmware, this block diagram is applicable after the program has been loaded from the ROM into the RAM. In this diagram, those blocks having dark lines and rounded corners refer to processes, whereas the square blocks refer to structures or RAM representations that hold temporary data. The solid lines designate paths for data transmission between processes and the structures, whereas the dashed lines represent control signals. The LIS firmware can be considered to be state-machine, i.e., each process is an operating state for the particular device. Some event, such as an incoming message, actuates one of these processes which, in turn, actuates another process through one of the dashed lines shown in FIG. 4. At any given time, this LIS firmware could be in one of these states.

Figure 5:
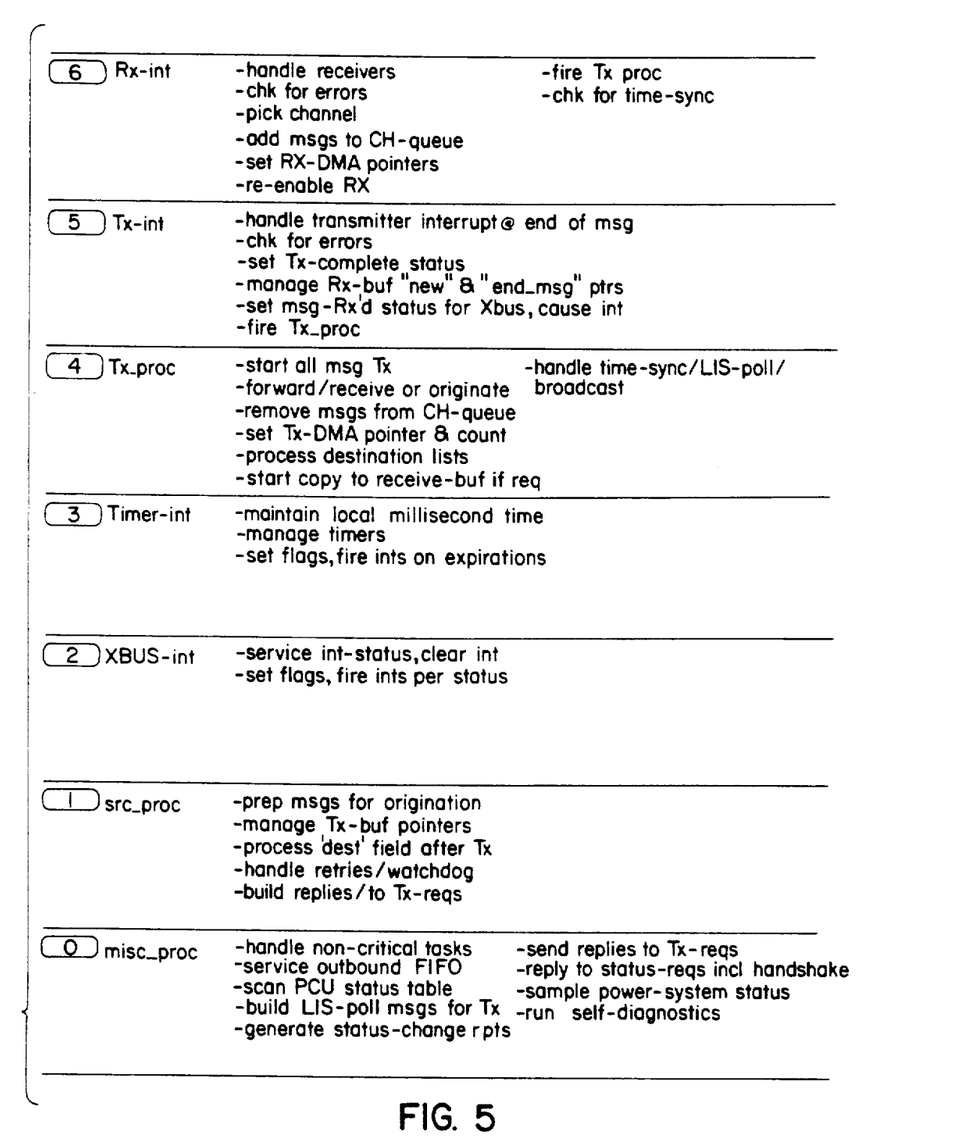
FIG. 5 is a listing of the task structure for the Loop Interface Slave (LIS) module of the present invention.

Referring now to FIG. 5, which illustrates the LIS task structure, the first number in front of each task indicates the interrupt level of the process, i.e., where it belongs in the hierarchy of the software states. The RX-INT task handles the receivers, i.e., incoming data from the receive channels would be processed by this function. The TX-INT task is a transmitter interrupt processor. It should be noted that the RX-INT and the TX-INT tasks are both hardware functions, i.e., these interrupts occur from the hardware and cause the firmware to execute the appropriate code. The TX-PROC task, invoked by software, represents the transmitter processing in the software. The TIMER-INT task represents a timer circuit in the LIS hardware, the operation of which would cause some instructions to update timers. The XBUS-INT task is a hardware level interrupt indicating that the communication module has some message or data to send to the LIS over the Expander Bus. The SRC-PROC task processes messages that have been sourced by this particular node. Again, this process is invoked by software. The MISC-PROC task refers to miscellaneous processing that must occur. Typically these are lower level software operations that are not as time-critical as receiving and transmitting messages. The main function of the LIS is to transmit data into and out of its node. In view of this, receiving and transmitting are primary functions. The MISC-PROC task consists of clean-up type functions that must be done.

Figure 6:
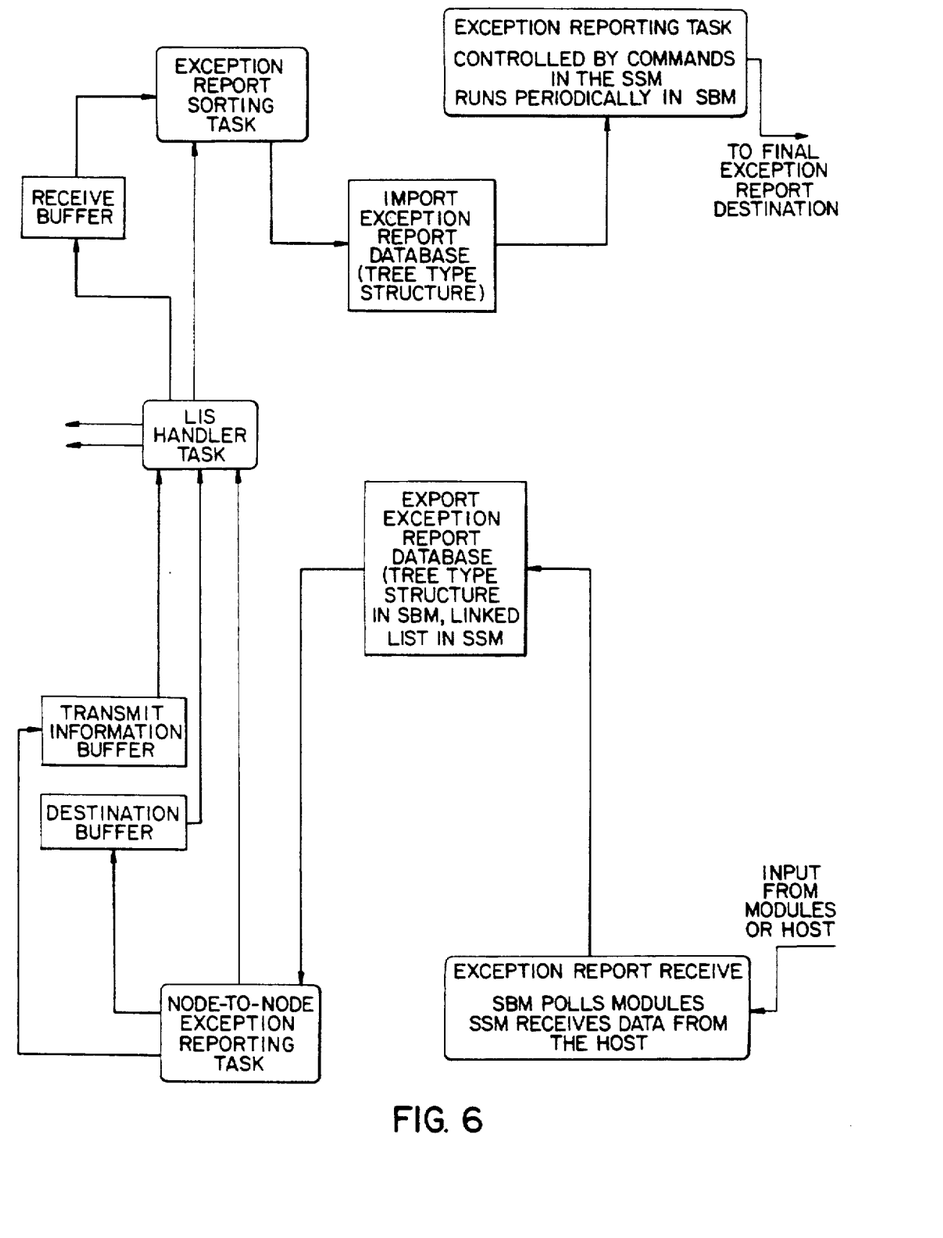
FIG. 6 is a schematic drawing of the Superloop Bus Module (SBM) and the Superloop Storage Module (SSM) of the present invention illustrating the handling of exception reports by same.

The software that is contained within the Superloop Bus Module (SBM) 52 and the Superloop Storage Module (SSM) 60 consists of a number of tasks which are designed to transmit data through the respective module. Most of the tasks are common to the prior art, however, those that are not common are shown in FIG. 6. In this Figure, each block having round corners represents a task which participates in the transmission of data into or out of the module. Each block having square corners represents a buffer or a RAM space where data is stored until it is required by one of the tasks. Referring now to the function entitled LIS handler task, this task is the software interface to the expander bus which allows communication to the LIS module. The input side to the LIS handler task function is represented by the upper blocks in FIG. 6 whereas the output side from the LIS handler task function is represented by the lower blocks in the foregoing Figure. Incoming data passes through the LIS handler task function into the receive buffer from which it is transmitted to the exception report sorting task which deciphers the incoming data and finds the location in RAM where that data is to be stored. The mechanism by which the data is stored is called a TREE data base. This type of data base is used to allow efficient sorting and recovery of data based on an index. The data is asynchronously removed from that data base by the exception reporting task. This task packs the data that is in the data base in a manner that is understood by the modules in the process control unit, in the case of the SBM, and by a host computer, a Management Command System or an Operator Interface Unit, in the case of the SSM.

With respect to the output side of the LIS handler task function, in the case of an SBM, the exception report receive task polls the modules in the process control unit for any exception report data that needs to be sent out onto the loop. In the case of an SSM, this data would be received by a command from the host computer or the Management Command System.

As with the input side, data is stored in an output data base. In the case of an SBM, the output data base is a TREE type structure whereas in the case of an SSM, the data base is a LIST type structure. Operating asynchronously to this, there is a node-to-node exception reporting task whose function is to remove the data from the data base, format the data into messages that are handled by the loop, and then pass that information out onto the loop. The output data is formatted into superloop frames which are group of messages that are transmitted on the loop. The information that goes out onto the loop consists of two parts. The first part is the data that is required by another node in the system, such as exception report data or operator initiated commands. The second part is system information or information that is required to efficiently route information to its ultimate destination. These types of data are respectively contained in the transmit information buffer and the destination buffer shown in FIG. 6. The LIS handler task function has the responsbility of taking the data from the transmit information buffer and the destination buffer and transmitting it over the expander bus to the LIS. As previously stated, there is node-to-node exception reporting task whose function is to remove data from the data base formatted into messages that are handled by the loop, and transmit that information out onto the loop. The foregoing is accomplished by the algorithm shown in FIG. 7. This algorithm is unique in that its purpose is to store the information and messages in a manner so as to optimize the available bandwidth on the loop. The operation of the algorithm is such that if messages can be sent, i.e., if there is room available on the loop to send messages, the messages will be sent immediately to speed the response to these messages. If, however, the loop is in use at the time data is ready to be sent out of the node, this algorithm will continue to pack information into a single message in order to provide a larger message so that when an opening does appear on the loop, as much information as possible will be transmitted thereon. The design of the loop is such that only one message can be outstanding from any given node at a particular time, and therefore, this algorithm allows each message to maximize the amount of data that the node can generate.

Figure 7:
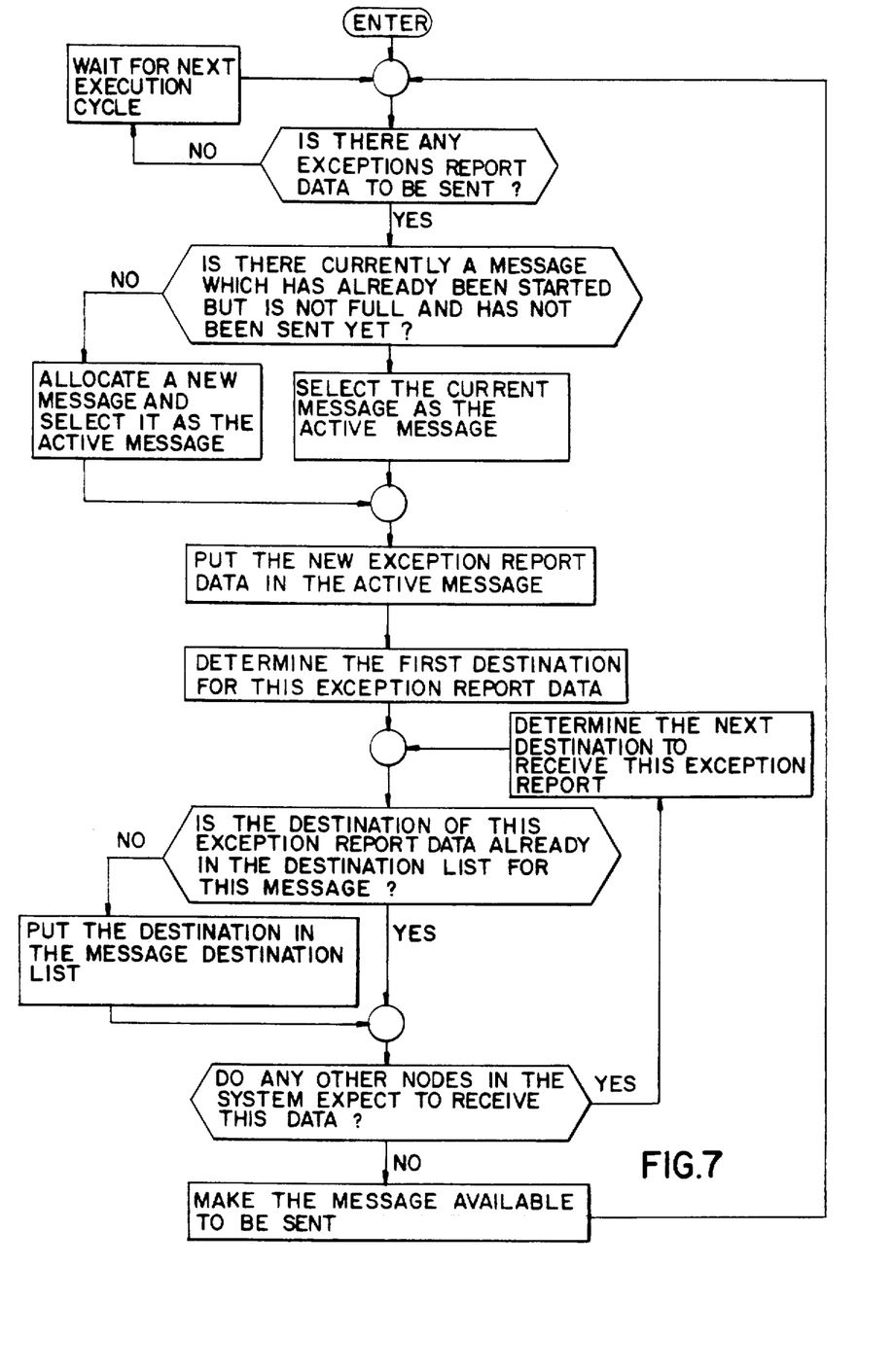
FIG. 7 is a flow chart of the exception report packing algorithm for the Superloop Bus Module (SBM) and the Superloop Storage Module (SSM) of the present invention.

Referring now to FIG. 7, the block designated ENTER signifies the start of the program. The algorithm runs periodically and, as such, there is no exit point from the algorithm. There is a time-dependent execution cycle which controls the operation of this algorithm. This cycle can be adjusted to run at various time intervals depending upon the requirements of the communication system in which it is installed. The entry into the program requires determining if there is any message that is currently being built in the transmit information buffer and the destination buffer. If a message exists in these buffers, and there is more room to hold additional information therein, the new information is simply added to these messages; in effect, lengthening the original message. If no message exists in these buffers, the algorithm will allocate a new message and place same in the buffers. The destination of the information is placed in the destination buffer. If multiple destinations are to receive the same exception report data, a single message is formatted which contains not only the exception report data, but a list of all destinations which are to receive these data. This approach reduces the number of messages that must be sourced from a particular node to communicate to all of the desired data destinations. For example, if ten destinations require a single piece of data, a single message would be sent and recognized by all ten destinations. Thus, instead of ten individual messages, only a single message is required to be sourced by the original node. The task, after it has completely sourced all of the exception report data which it has received from the modules, then waits for the next execution cycle to commence before it runs again.

The message size that goes out onto the loop must fit within certain system constraints. The message consists of an information field and system fields. The information field is the part of the message which contains the exception report data. This has a minimum length of four bytes up to a maximum length of 1500 bytes. Any exception report data would have a minimum length of approximately 10 bytes up to a maximum length of 1500 bytes. The system information that is transferred with the message contains a fixed number of bytes and a destination list which is constructed from the information in the destination buffer. The number of destinations in this list can be between zero up to 64 destinations. The case of zero destinations would involve a broadcast message, i.e., a message that is needed by all nodes.

Certain modifications and improvements will occur to those skilled in the art upon reading the foregoing. It should be understood that all such modifications and improvements have been deleted herein for the sake of conciseness and readability, but are properly within the scope of the following claims.

I claim:

1. A method of entering updating information from one source unto a plant loop connecting said one source to a plurality of other sources and said loop using said one source information comprising the steps of:

inputting said updating information from said one source and the location of said other sources on said loop receiving said information into a data base of a super bus module for awaiting input into said loop;

checking said data base by said super bus module for available room for added updating information and said other source location and entering said added information and said other source location thereto if said data base has unused room therein;

sending the information from said data base to said plant loop using a loop interface slave to make said information available to all other sources connected thereto identified in said data base by said one source whenever said plant loop is available for receiving the information; and reading an operating program by said loop interface slave from ROM based firmware into a RAM memory to allow a more speedy execution of the software and improved connection to the plant loop thereby.

2. A method as set forth in claim 1, wherein said one source runs at a first speed slower than a second speed at which said plant loop runs and wherein said data base stores said updating information to allow asynchronous operation of said one source and said plant loop.

3. A method as set forth in claim 2, wherein said step of sending said information from said data base is done by said loop interface slave simultaneously with the receiving and processing of messages from said plant loop.

* * * * *